Jan. 3, 1956 G. B. ANDREWS ET AL 2,729,815
SWEEP CIRCUIT
Filed Sept. 19, 1951 2 Sheets-Sheet 2

INVENTORS
GILMAN B. ANDREWS
BY RALPH L. DeVOLL
WILLIAM X. LAMB JR.
Ellsworth R. Rooten
ATTORNEY

United States Patent Office 2,729,815
Patented Jan. 3, 1956

2,729,815

SWEEP CIRCUIT

Gilman B. Andrews, Royal Oak, Ralph L. De Voll, Grosse Pointe, and William X. Lamb, Jr., Detroit, Mich., assignors, by mesne assignments, to the United States of America as represented by the United States Atomic Energy Commission Application September 19, 1951, Serial No. 247,285

11 Claims. (Cl. 343—13)

This invention relates to a sweep circuit and more particularly to a sweep circuit for displaying, in one sweep and in expanded form, two pulses which may be separated by a considerable period of time.

In many radar applications, pulses are transmitted to a distant object from a central station and are reflected by the distant object back to the central station. By comparing the transmitted and received pulses, such information as the distance and direction of the distant object relative to the central station can be obtained.

One way of comparing the transmitted and received pulses is to examine them visually on the cathode ray tube of an oscilloscope. In order for both pulses to appear on the same sweep, however, the sweep must occupy a relatively great period of time since the period of time between the transmission of pulses at the central station and the reception of pulses back at the central station is usually greater than the width of the pulses themselves. Such a sweep over a long period of time is necessary because no circuits have been developed until now for sweeping the beam in an oscilloscope only at the times that the pulses are being transmitted and received. This causes the transmitted and received pulses to appear almost as vertical lines if they are both to appear on the same sweep and prevents the pulses from being accurately compared.

This invention provides a circuit for presenting transmitted and received pulses in expanded form on an oscilloscope. The circuit operates by partially sweeping an oscilloscope beam in a horizontal direction during the transmission of a pulse from a central station, cutting off the sweep during the time that the pulse is traveling to a distant object and back to the central station and continuing the sweep from its interrupted position just prior to and during the time that the pulse is being received at the central station. In this way the transmitted and received pulses appear adjacent to each other in expanded form on the face of the oscilloscope so as to provide an easy and accurate comparison of their wave shapes. The circuit requires a minimum number of components and is completely reliable in operation.

An object of this invention is to provide a circuit for making a pair of pulses appear in expanded form on an oscilloscope during one sweep of the oscilloscope beam.

Another object of the invention is to provide a circuit of the above character for showing in expanded form, during one sweep of an oscilloscope beam, a pair of pulses separated by a period of time which is considerably greater than the duration of the pulses themselves.

A further object is to provide a circuit for partially sweeping a beam in a horizontal direction during the transmission of a pulse, cutting off the beam until the reception of a related pulse and continuing the sweep from the interrupted position just prior to the reception of the related pulse.

Still another object is to provide a circuit of the above character which operates reliably even with a variable separation in time between the transmitted and received pulses.

Other objects and advantages will be apparent from a detailed description of the invention and from the appended drawings and claims.

Figure 1:
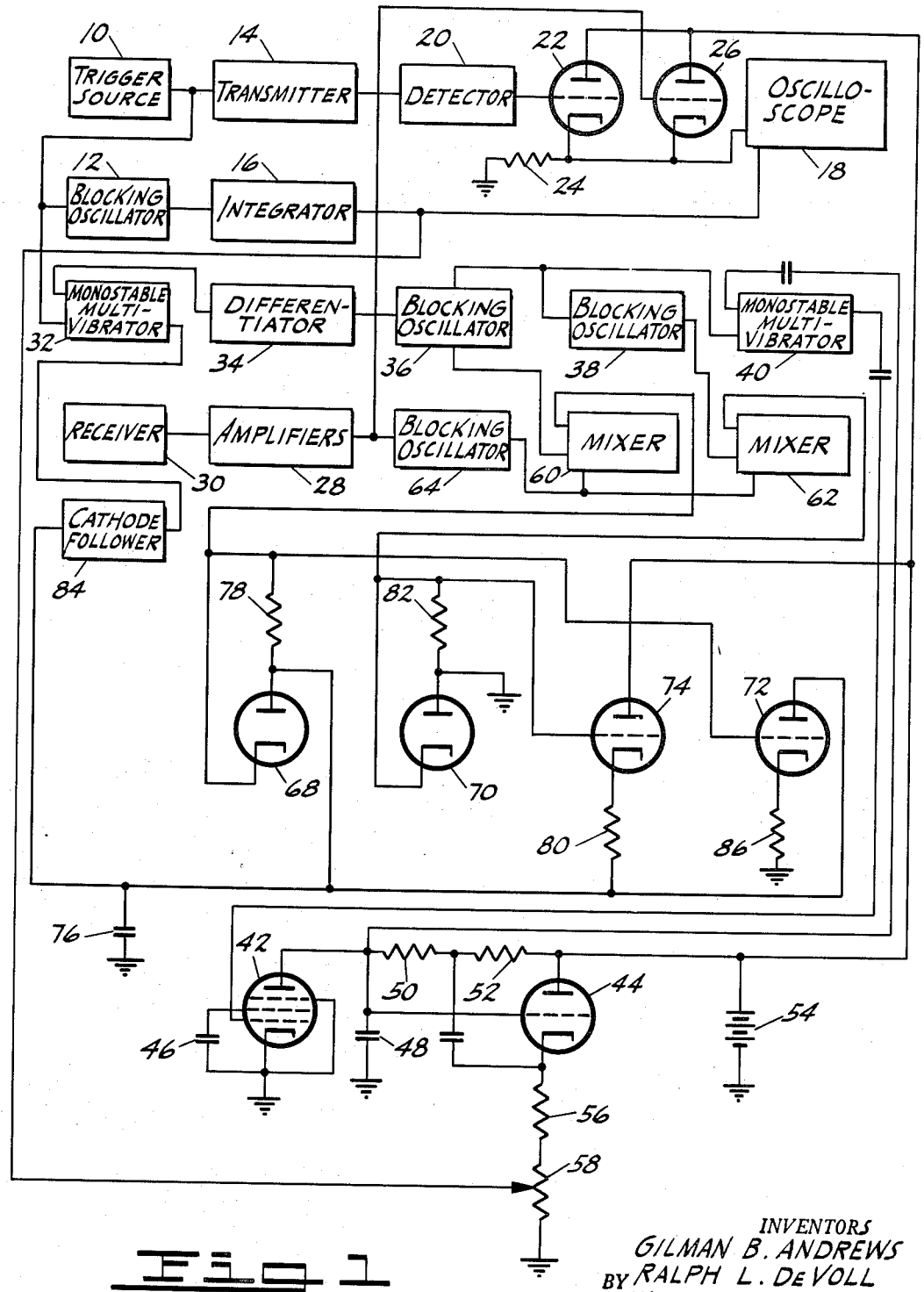
Figure 1 is a circuit diagram, partly in block form, of one embodiment of the invention.

In one embodiment of the invention, a trigger source 10 is provided for producing pulses at a predetermined frequency, such as 4,000 cycles per second. The output from the trigger source 10 is introduced to a blocking oscillator 12 and to a transmitter 14. The output from the oscillator 12 is in turn introduced to the input terminal of an integrator 16 having its output terminal connected to the horizontal deflection plates of the cathode ray tube in an oscilloscope 18.

A connection is made from the output terminal of the transmitter 14 to the input terminal of a detector 20, the output terminal of which is connected to the grid of a triode 22. The cathode of the triode 22 is grounded through a resistance 24 and is connected to the cathode of a triode 26 and to the vertical deflection plates of the cathode ray tube in the oscilloscope 18. The grid of the triode 26 is connected to the output terminal of amplifier stages 28, which have pulses introduced to them from a receiver 30.

In addition to being connected to the oscillator 12 and the transmitter 14, the trigger source 10 is connected to the grid of the left tube in a mono-stable multivibrator 32 having its plate connected to the input terminal of a differentiator 34. The output from the differentiator 34 is introduced to a blocking oscillator 36, an output terminal of which is connected to the input terminal of a blocking oscillator 38 and to the grid of the left tube in a mono-stable multivibrator 40.

The plate of the left tube in the multivibrator 40 is coupled through a suitable capacitance to the plate of a pentode 42 and to the grid of a triode 44. The plate of the right tube in the multivibrator 40 is coupled through a suitable capacitance to the control grid of the pentode 42. The cathode and suppressor grid of the pentode 42 are directly grounded, and the screen grid is grounded through a capacitance 46. In addition to its connection to the multivibrator 40 through a suitable coupling capacitance, the plate of the pentode 42 is connected to a grounded capacitance 48 and is supplied through series resistances 50 and 52 with positive voltage from a suitable power supply, such as a battery 54, having a grounded negative terminal. The battery 54 also applies a positive voltage on the plates of the triodes 22 and 26.

The plate of the triode 44 is connected directly to the positive terminal of the battery 54, and the cathode is coupled through a suitable capacitance to the common terminal between the resistances 50 and 52. The cathode of the tube 44 is also grounded through a resistance 56 and a potentiometer 58 in series, the movable contact of the potentiometer being connected to the horizontal deflection plates of the cathode ray tube in the oscilloscope 20.

In addition to the connections previously disclosed, output terminals of the blocking oscillators 36 and 38 are connected to the control grids (No. 3) of the pentogrid mixers 60 and 62, respectively. The control grids (No. 1) of the mixers have voltage introduced to them from the output terminal of a blocking oscillator 64, which is triggered by signals from the amplifier stages 28. The plates of the pentogrid mixers 60 and 62 are respectively connected to the cathodes of the diodes 68 and 70 and to the grids of triodes 72 and 74.

The plate of the diode 68 is connected to a relatively large storage capacitance 76 grounded at one end, to the cathode of the diode through a resistance 78 and to the cathode of the triode 74 through a resistance 80. The plate of the diode 70 is grounded and is also connected to the cathode of the diode through a resistance 82 equal to the resistance 74.

The plate of the triode 74 is supplied with positive voltage from the battery 54. Connections are made from the plate of the triode 72 to the plate of the tube 68 and to the input terminal of a cathode follower 84 having its output terminal connected to the grid of the right tube in the multivibrator 32. The cathode of the tube 72 is grounded through a resistance 86 equal to the resistance 80.

Figure 3:
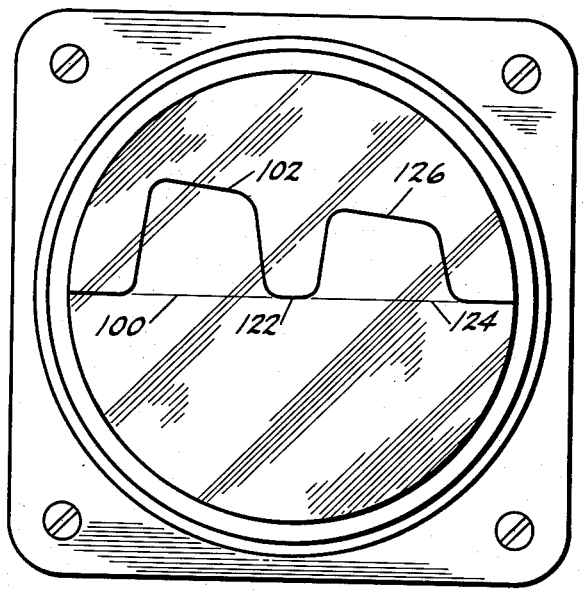
Figure 3 is a schematic diagram illustrating the appearance of a sweep produced on the face of a cathode ray tube by the circuit shown in Figure 1.

In operation, each of the pulses from the source 10 triggers the blocking oscillator 12 into producing a pulse having an increased length over that of the trigger pulse. The pulse from the blocking oscillator 12 is integrated by the integrator 16. The signal produced by the integrator occurs during the radiation of a pulse by the transmitter 14 and increases substantially linearly in amplitude with respect to time. This substantially linear signal is introduced to the horizontal deflection plates of the cathode ray tube in the oscilloscope 18 to produce a partial deflection of the beam in a horizontal direction across the face of the tube, as indicated at 100 in Figure 3. At the same time, the transmitted signal is delayed slightly by a delay stage (not shown) and is then introduced to the vertical deflection plates of the cathode ray tube through the detector 20 and the cathode follower stage which includes the triode 22 and resistance 24. This causes a pulse similar to the transmitted pulse to appear on the left portion of the cathode ray tube in the oscilloscope 18, as indicated at 102 in Figure 3.

In operation each of the pulses from the source 10 also cuts off the normally conductive left tube in the multivibrator 32 for a period of time determined by the voltage on the grid of the right multivibrator tube. Cutting off the left tube in the multivibrator 32 causes a positive pulse to be produced on its plate, as indicated at 104 in Figure 2. The trailing edge of the positive pulse 104 is differentiated by the differentiator 34 to produce a negative signal illustrated at 106 in Figure 2. The signal 106 in turn triggers the blocking oscillator 36 and causes a positive pulse 108 of relatively short duration to be produced by the oscillator. At the end of the pulse 108 the blocking oscillator 36 triggers the blocking oscillator 38 to produce a pulse 110 similar to the pulse 108.

Figure 2:
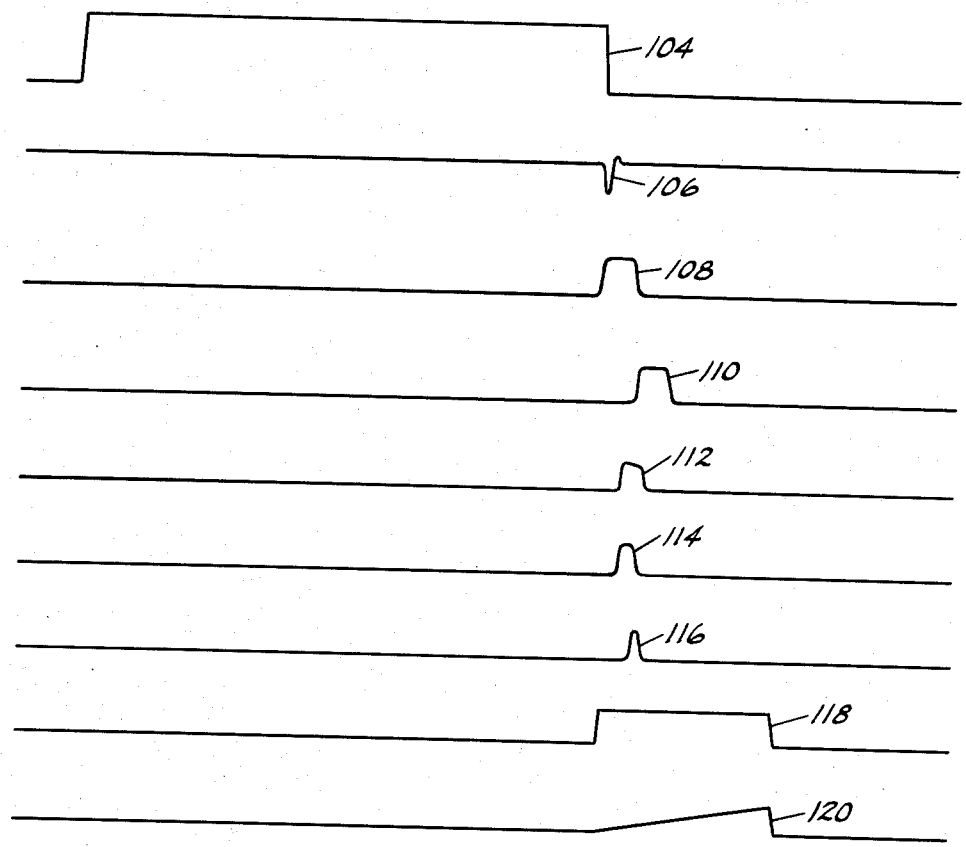
Figure 2 shows wave shapes of different voltages at strategic terminals in the circuit shown in Figure 1.

The pulses 108 and 110 from the blocking oscillators 36 and 38 are introduced into the mixers 60 and 62, respectively, where the pulses are mixed with a received pulse, as indicated at 112, passing through the amplifiers 28 and the blocking oscillator 64. Each of the mixers 60 and 62 passes the received pulse 112 during the time that the pulse coincides with the pulse introduced to the mixer from one of the blocking oscillators 36 and 38. Thus, if the received pulse 112 occurs at an intermediate time relative to the pulses 108 and 110, the signals passing through the mixers 60 and 62 have equal strengths. If more coincidence occurs in the mixer 60 than in the mixer 62, the signal passing through the mixer 60 is stronger than the signal passing through the mixer 62. In Figure 2, for example, the mixer 60 is shown as passing a signal 114 stronger than the signal, illustrated at 116, passing through the mixer 62, since the received pulse coincides more with the pulse 108 than with the pulse 110.

The signals passing through the mixers 60 and 62 are rectified by the diodes 68 and 70 and are then applied as bias voltages on the grids of the triodes 72 and 74, respectively. The grids of the triodes 72 and 74 are ordinarily biased relative to their cathodes so that equal currents flow through the triodes when signals of equal strength pass through the mixers 60 and 62, respectively. Since the triodes 72 and 74 are in a series circuit which includes the battery 54, the triode 74, the resistance 80, the triode 72 and the resistance 86, the equal currents through the triodes cause the plate of the tube 72 to have a voltage equal to approximately one-half of that supplied by the battery 54.

When the signal passing through the mixer 60 has a greater strength than the signal passing through the mixer 62, the grid of the triode 72 becomes negatively biased relative to the grid of the triode 74 and causes the resistance provided by the tube 72 to exceed that provided by the tube 74. Because of the change in the resistances provided by the tubes 72 and 74, the voltage on the plate of the triode 72 rises above a value which is half of that from the battery 54.

The increase in voltage on the plate of the triode 72 is introduced through the cathode follower 84 to the grid of the right tube in the multivibrator 32 and is instrumental in reducing the length of the pulse 104 produced on the plate of the left tube in the multivibrator 32. Because of the decrease in the length of the pulse from the multivibrator 32, the blocking oscillators 36 and 38 produce their gating pulses 108 and 110 at an earlier time relative to the time at which a pulse 112 is being received by the receiver 30. By gradually adjusting the time at which the blocking oscillators 36 and 38 produce their gating pulses, approximately one-half of the pulse 112 from the receiver 30 can be introduced to the mixer 60 during the introduction of the pulse 108 and the other half of the pulse 112 can be introduced to the mixer 62 during the introduction of the pulse 110. By such a gradual adjustment, the pulses produced by the blocking oscillators 36 and 38 eventually define the time at which a pulse is to be received from a distant object as a result of the reflection of a transmitted pulse.

A negative pulse complementary to the positive pulse 108 is also produced by the blocking oscillator 36 at the same time as the pulse 108. Since the complementary negative pulse occurs slightly before the reception of the reflected pulse, it is used to produce a horizontal sweep of the beam in the cathode ray tube of the oscilloscope 18 over the remaining portion of the tube. To produce this sweep, the complementary negative pulse is introduced to the grid of the left tube in the multivibrator 40. Each of the negative pulses complementary to the pulses 108 cuts off the normally conductive left tube in the multivibrator 40 for a period of time corresponding to the time required to produce the remainder of the sweep and produces on its plate a positive pulse, illustrated at 118 in Figure 2. During the time that the left multivibrator tube is cut off, the right tube conducts and produces on its plate a negative pulse complementaary to the positive pulse 118. This negative pulse is introduced to the grid of the normally conductive pentode 42 to cut off the tube.

Because of the current normally flowing through the pentode 42, the capacitance 48 is substantially short circuited. This short circuit is removed when the pentode becomes cut off, and the capacitance is then charged through a circuit which includes the battery 54, the resistances 52 and 50 and the capacitance. The relatively large value of the capacitance 48 causes it to be charged linearly with respect to time and a sawtooth voltage, illustrated at 120 in Figure 2, to be produced across it for introduction to the grid of the cathode follower 44.

As will be seen in Figure 2, the positive rectangular pulse 118 and the positive sawtooth pulse 120 are simultaneously introduced to the grid of the triode 44. The simultaneous introduction of these two voltages causes the triode 44 to start conducting instantaneously at a relatively high intensity. This instantaneous current produces an instantaneous voltage on the movable arm of the potentiometer 58, corresponding to the maximum voltage produced across the integrator 16. Since the integrator 16 and the movable arm of the potentiometer 58 are both connected to the horizontal deflection plates of the cathode ray tube in the oscilloscope 18, the beam in the cathode ray instantaneously shifts to the position at which it was previously interrupted. This position is indicated at 122 in Figure 3. The sweep then proceeds linearly in a horizontal direction over the remaining portion of the tube as a result of the action of the sawtooth voltage 120 and the feedback provided from the cathode of the triode 44 to the common terminal between the resistances 50 and 52. The sweep over the remaining portion of the tube is illustrated at 124 in Figure 3.

During the time that the linear sweep is taking place, the pulse reflected from the distant object is being received by the receiver 30 and introduced to the vertical deflection plates of the cathode ray tube through the cathode follower which includes the triode 26 and the resistance 24. As a result, the reflected pulse appears in amplified and undistorted form on the last portion of the sweep, as illustrated at 126 in Figure 3.

The circuit disclosed above has several important advantages. By horizontally sweeping the beam of the cathode ray tube in the oscilloscope 18 only during the times that pulses are being transmitted and received, the full capabilities of the oscilloscope are utilized to show the shape of the pulses. As a result, each transmitted pulse and the received pulse related to it appear adjacent to each other in expanded form on the face of the cathode ray tube and provide an easy comparison of their shapes. The circuit operates to cut off the sweep just after the transmitted pulse and to reinstitute the sweep from its interrupted position just before the received pulse, even though the time at which the received pulse arrives may vary with respect to the time at which the transmitted pulse is radiated.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A sweep circuit for deflecting a beam in an oscilloscope, including, a trigger source operative to produce pulses at a predetermined frequency, a transmitter for sending out the pulses, means for converting each trigger pulse into a first substantially sawtooth voltage operative to produce a partial horizontal sweep of the beam in the oscilloscope during the transmission of the pulse, means for receiving pulses related to the transmitted pulse, gating means operative to determine the time for pulse reception, the gating means including means for producing a signal slightly before the pulse reception, means operative by the gating signal to produce a pulse having a duration substantially equal to the horizontal portion remaining unswept after the partial sweep produced by the trigger pulse and having an amplitude corresponding to the maximum value of the first sawtooth voltage, a capacitance adapted to be charged by the last mentioned pulse to produce a second substantially sawtooth voltage, and means for superimposing the two pulses produced slightly before the pulse reception to produce a sweep commencing at the end of the sweep produced by the first sawtooth voltage.

2. A sweep circuit for deflecting a beam in an oscilloscope, including, a trigger source operative to produce pulses at a predetermined frequency, means operative by each trigger pulse to produce a partial horizontal sweep of the beam in the oscilloscope, a transmitter for sending out the pulses, a receiver for receiving pulses related to the transmitted pulses, means for producing a first signal at approximately the time that each pulse is being received, means for producing a second signal at a slightly later time than the first signal, means for mixing the first signal with the received pulse to produce a first control signal, means for mixing the second signal with the received pulse to produce a second control signal, means for comparing the first and second control signals to produce a resultant control signal, means operative by the resultant control signal to adjust the time at which the first and second signals are formed for the production of first and second control signals with equal amplitudes, and means operative by each of the first control signals to complete the horizontal sweep during the time that a pulse is being received.

3. A sweep circuit for deflecting a beam in an oscilloscope, including, a trigger source operative to produce pulses at a predetermined frequency, means operative by the trigger source to produce pulses for transmission, means operative by the trigger source to produce a partial horizontal deflection of the beam in the oscilloscope at the time of each pulse transmission, means for introducing the transmitted pulse to the oscilloscope to produce a vertical deflection of the beam in a pattern corresponding to the shape of the transmitted pulse, means operative slightly before the reception of a pulse related to the transmitted pulse to instantaneously shift the beam in a horizontal direction to its interrupted position, means for linearly deflecting the beam in a horizontal direction from its interrupted position during each pulse reception, and means for introducing each received pulse to the oscilloscope to produce a vertical deflection of the beam in a pattern corresponding to the shape of the received pulse.

4. A sweep circuit for deflecting a beam in an oscilloscope, including, a trigger source operative to produce pulses at a predeterimned frequency for transmission, means for converting each trigger pulse into a sawtooth voltage for producing a partial horizontal deflection of the beam in the oscilloscope, means for introducing each transmitted pulse to the oscilloscope to produce a vertical deflection of the beam in a pattern corresponding to the shape of the transmitted pulse, means for producing a pulse for blanking the oscilloscope, means operative at the end of the blanking pulse to produce a first gating signal, means operative by the first gating signal to produce a second gating signal, means for adjusting the duration of the blanking pulse to produce a time coincidence between the first gating signal and each received pulse and between the second gating signal and each received pulse, means operative by each of the first gating signals to continue the sweep in a horizontal direction from its interrupted position, and means for introducing each received pulse to the oscilloscope to produce a vertical deflection of the beam in a pattern corresponding to the shape of the received pulse.

5. A sweep circuit for deflecting a beam in an oscilloscope, including, a trigger source operative to produce pulses at a predetermined frequency for transmission, means operative by the trigger source to produce a partial horizontal deflection of the beam in the oscilloscope at the time of each pulse transmission, a normally conductive tube, a capacitance connected across the tube, means for linearly charging the capacitance when the tube becomes cut off, means operative slightly before the reception of a pulse related to the transmitted pulse to produce a signal for cutting off the tube, means for mixing the voltage produced as a result of the charging of the capacitance and the voltage for cutting off the tube, and means operative by the mixed voltages to start the horizontal sweep of the beam instantaneously from its interrupted position and to continue the sweep in a linear movement across the remaining portion of the oscilloscope.

6. A sweep circuit for deflecting a beam in an oscilloscope, including, a trigger source operative to produce pulses at a predetermined frequency for transmission, means operative by the trigger source to produce a partial horizontal deflection of the beam in the oscilloscope at the time of each pulse transmission, gating means operative to determine the time for pulse reception, the gating means including means for producing a signal slightly before the pulse reception, means operative in conjunction with the gating means to adjust the time at which the gating signal is produced in accordance with any variations in the time at which each pulse is received, a normally conductive tube, a capacitance connected across the tube, means for linearly charging the capacitance when the tube becomes cut off, means operative by the gating signal to produce a pulse for cutting off the tube, means for mixing the voltage produced as a result of the charging of the capacitance and the voltage for cutting off the tube, and means operative by the mixed voltages to start the horizontal sweep of the beam instantaneously from its interrupted position and to continue the sweep in a linear movement across the remaining portion of the oscilloscope.

7. A sweep circuit for deflecting a beam in an oscilloscope, including, a trigger source operative to produce pulses at a predetermined frequency for transmission, means operative by the trigger source to produce a partial horizontal deflection of the beam in the oscilloscope at the time of each pulse transmission, gating means for producing a control signal at substantially the time that a pulse related to the transmitted pulse is to be received, a multivibrator operative by the control signal to produce a pulse for a period of time corresponding to that required to produce a deflection of the beam from the interrupted position through the remaining portion of the oscilloscope, a capacitance, means operative during the pulse from the multivibrator to produce a substantially linear charging of the capacitance, a tube, and means for applying to the tube the voltage pulse from the multivibrator and the voltage on the capacitance to produce an output voltage having an initial amplitude for initiating a sweep of the beam from its interrupted position and for continuing the sweep through the remaining portion of the oscilloscope.

8. A sweep circuit for deflecting a beam in an oscilloscope, including, a trigger source for producing pusles at a predetermined frequency for transmission, means for converting each trigger pulse into a first sawtooth voltage to produce a partial horizontal deflection of the beam in the oscilloscope, gating means for producing a control signal at substantially the instant that a pulse related to the transmitted pulse is to be received, a monostable member adapted to be triggered by the control signal and to produce a substantially rectangular pulse for a period of time corresponding to that required to deflect the beam from its interrupted position through the remaining portion of the oscilloscope, a normally conductive tube adapted to become cut off during the introduction to it of the rectangular pulse, a capacitance connected across the tube to become linearly charged during the time that the tube is cut off, a second tube connected to the capacitance and the monostable member to produce a second sawtooth voltage having an initial value corresponding to the maximum value of the first sawtooth voltage, and means for introducing the second sawtooth voltage to the oscilloscope to produce a deflection of the beam through the remaining portion of the oscilloscope.

9. A sweep circuit for deflecting a beam in an oscilloscope, including, a trigger source for producing pulses at a predetermined frequency for transmission, means for converting each trigger pulse into a first sawtooth voltage to produce a partial horizontal deflection of the beam in the oscilloscope, gating means for producing a control signal at substantially the instant that a pulse related to the transmitted pulse is to be received, a multivibrator for producing a pulse, upon the formation of the control signal, for a period of time corresponding to that required for the beam to sweep from its interrupted position through the remaining portion of the tube, a first normally conductive tube, means for introducing the multivibrator pulse to the tube to cut off the tube, a capacitance connected across the tube for linear charging during the period that the tube is cut off, a second tube, means for introducing to the second tube the multivibrator pulse and the voltage on the capacitance to produce a change in the conductance through the tube, a resistance connected to the second tube for producing a voltage having an initial value corresponding to the maximum amplitude of the first sawtooth voltage and having a value increasing in a sawtooth shape from the initial value, and means for introducing the voltage across the resistance to the oscillator to produce a deflection of the beam through the remaining portion of the oscilloscope.

10. A sweep circuit for deflecting a beam in an oscilloscope, including, a trigger source operative to produce pulses at a predetermined frequency, means operative by each trigger pulse to produce a partial deflection of the oscilloscope beam in a first direction, a transmitter for sending out the pulses and associated with the oscilloscope for producing in accordance with the amplitude of each transmitted pulse a deflection of the beam in a second direction substantially perpendicular to the first direction, means connected to the triggering source for producing a control signal at substantially the instant that a pulse related to each transmitted pulse is to be received, a multivibrator operative upon the introduction of the control signal to produce a pulse for a period of time corresponding to that required for deflecting the oscilloscope beam in the first direction from its interrupted position through the remaining portion of the oscilloscope, means connected to the oscilloscope and operative upon introduction of the multivibrator pulse to produce a deflection of the beam in the first direction through the remaining portion of the oscilloscope, and a receiver for receiving the pulses related to the transmitted pulses and connected to the oscilloscope for producing in accordance with the amplitude of each related pulse a deflection of the beam in the second direction during the period that the beam is deflected in the first direction through the remaining portion of the oscilloscope.

11. A sweep circuit for deflecting a beam in an oscilloscope, including, a triggering source operative to produce pulses at a predetermined frequency, means connected to the triggering source for converting each trigger pulse into a first sawtooth voltage to produce a partial horizontal deflection of the beam in the oscilloscope, a transmitter connected to the triggering source for sending out each trigger pulse and for producing in accordance with the amplitude of each trigger pulse a vertical deflection of the beam during the period of partial deflection of the beam in the horizontal direction, means connected to the triggering source for producing a first signal slightly before a pulse related to a transmitted pulse is to be received and for producing a second signal slightly after the related pulse is to be received, means for mixing the first and second signals with a received pulse to produce an error signal, means operative by the error signal to adjust the time at which the first and second signals are produced to minimize the error signal, means for producing a third signal at the time of production of the first signal, a multivibrator operative by the third signal to produce a pulse for a period of time corresponding to that required for deflecting the beam in the horizontal direction from its interrupted position through the remaining portion of the oscilloscope, a first normally conductive tube, means for introducing the multivibrator pulse to the first tube to cut off the tube, a capacitance connected across the tube for linear charging during the period that the tube is cut off, a second tube connected to the capacitance and the multivibrator to produce a second sawtooth voltage having an initial value corresponding to the maximum value of the first sawtooth voltage, means for introducing the second sawtooth voltage to the oscilloscope to produce a deflection of the beam in the horizontal direction through the remaining portion of the oscilloscope, and a receiver for receiving the pulses related to the transmitted pulses and for producing in accordance with the amplitude of each related pulse received a deflection of the beam in the vertical direction during the period of introduction of the second sawtooth voltage to the oscilloscope.

References Cited in the file of this patent

UNITED STATES PATENTS

| | | |
|---|---|---|
| 2,093,157 | Nakashima et al. | Sept. 14, 1937 |
| 2,439,321 | Starr | Apr. 6, 1948 |
| 2,453,711 | Isbister et al. | Nov. 16, 1948 |
| 2,465,368 | Frink | Mar. 29, 1949 |
| 2,492,700 | Jeanne | Dec. 27, 1949 |
| 2,533,670 | Hart | Dec. 12, 1950 |
| 2,551,681 | Lawrence, Jr., et al. | May 8, 1951 |
| 2,552,022 | Watson | May 8, 1951 |
| 2,576,948 | Le Roy | Dec. 4, 1951 |
| 2,634,410 | Collar | Apr. 7, 1953 |

OTHER REFERENCES

"Cathode Ray Tube Displays," pages 234–236, vol. 22, MIT Radiation Lab. Series, published in 1948.